(12) United States Patent
Bhutani

(10) Patent No.: US 7,940,520 B2
(45) Date of Patent: May 10, 2011

(54) REMOVABLE DISPLAY COVER

(75) Inventor: Gurmeet Singh Bhutani, Punjab (IN)

(73) Assignee: Dell Products L.P., Round Rock, TX (US)

( * ) Notice: Subject to any disclaimer, the term of this patent is extended or adjusted under 35 U.S.C. 154(b) by 328 days.

(21) Appl. No.: 12/142,001

(22) Filed: Jun. 19, 2008

(65) Prior Publication Data

US 2009/0231794 A1    Sep. 17, 2009

(30) Foreign Application Priority Data

Mar. 17, 2008  (IN) .............................. 675/DEL/2008

(51) Int. Cl.
*G06F 1/16*  (2006.01)

(52) U.S. Cl. ......... 361/679.21; 361/679.27; 361/679.28; 361/679.26; 349/58; 349/59

(58) Field of Classification Search .............. 361/679.29
See application file for complete search history.

(56) References Cited

U.S. PATENT DOCUMENTS

| | | | | | |
|---|---|---|---|---|---|
| 5,193,069 | A | * | 3/1993 | Furuya ...................... | 361/679.09 |
| 5,268,816 | A | * | 12/1993 | Abell et al. .............. | 361/679.09 |
| 5,379,182 | A | * | 1/1995 | Fujimori et al. ......... | 361/679.27 |
| 5,422,751 | A | * | 6/1995 | Lewis et al. ..................... | 349/59 |
| 5,570,267 | A | * | 10/1996 | Ma ........................... | 361/679.21 |
| 5,729,250 | A | | 3/1998 | Bishop | |
| 5,822,030 | A | * | 10/1998 | Uchiyama .................... | 349/149 |
| 5,870,282 | A | * | 2/1999 | Andre et al. ............. | 361/679.57 |
| 5,940,153 | A | | 8/1999 | Castaneda | |
| 5,946,061 | A | * | 8/1999 | Kurihara et al. ................. | 349/58 |
| 6,064,565 | A | * | 5/2000 | Ishihara et al. .......... | 361/679.27 |
| 6,125,033 | A | * | 9/2000 | Andre et al. ............. | 361/679.55 |
| 6,310,768 | B1 | * | 10/2001 | Kung et al. .............. | 361/679.29 |
| 6,330,148 | B1 | * | 12/2001 | Won et al. ................ | 361/679.26 |
| 6,421,231 | B1 | * | 7/2002 | Jung ........................ | 361/679.27 |
| 6,430,039 | B2 | * | 8/2002 | Nakajima et al. ........ | 361/679.27 |
| 6,498,718 | B1 | * | 12/2002 | Kim et al. ................ | 361/679.58 |
| 6,594,145 | B2 | * | 7/2003 | Williams et al. ......... | 361/679.41 |
| 6,956,637 | B2 | * | 10/2005 | Satonaka ...................... | 349/187 |
| 7,385,806 | B2 | * | 6/2008 | Liao ........................ | 361/679.01 |
| 7,545,629 | B1 | * | 6/2009 | Bauer et al. ............. | 361/679.27 |
| 7,606,023 | B2 | * | 10/2009 | Konno et al. ............ | 361/679.26 |
| 7,643,272 | B2 | * | 1/2010 | Yang et al. ............... | 361/679.01 |
| 7,663,871 | B2 | * | 2/2010 | Cho et al. ................. | 361/679.26 |
| 7,692,919 | B2 | * | 4/2010 | Liang et al. .............. | 361/679.29 |
| 2001/0009498 | A1 | * | 7/2001 | Oross et al. .................... | 361/681 |
| 2002/0080576 | A1 | * | 6/2002 | Katagiri ........................ | 361/686 |
| 2003/0103173 | A1 | * | 6/2003 | Satonaka ......................... | 349/58 |
| 2007/0091552 | A1 | * | 4/2007 | Liang et al. .................... | 361/681 |
| 2007/0253150 | A1 | * | 11/2007 | Yue et al. ....................... | 361/681 |

* cited by examiner

*Primary Examiner* — Jayprakash N Gandhi
*Assistant Examiner* — Anthony Q Edwards
(74) *Attorney, Agent, or Firm* — Haynes and Boone, LLP

(57) ABSTRACT

A display assembly includes a display bezel. A display is mounted to the display bezel. A display cable is coupled to the display. A display cover is coupled to the display bezel such that the display cover is operable to be decoupled from the display bezel while the display remains mounted to the display bezel and the display cable remains coupled to the display. The display cover may then be removed and personalized or replaced with a personalized display cover quickly and easily.

19 Claims, 15 Drawing Sheets

REMOVABLE DISPLAY COVER

BACKGROUND

The present disclosure relates generally to information handling systems, and more particularly to a removable display cover for use with an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

In some instances, it may be desirable to provide for the personalization of an IHS to a user. For some users, customizing the IHS to their tastes may be a major selling point of a particular IHS. However, providing such personalization may be problematic, as IHS manufacturers tend to manufacture IHSs in high volume, which can make such personalization costly.

For example, an area on most portable IHSs that lends itself to personalization is the display cover, which offers a large, mostly unused space that is visible when the IHS is both in use and not in use. However, the personalization of such display covers raises a number of issues.

Conventionally, the antennas, wiring, camera, inverter board, and display (such as, for example, a liquid crystal display (LCD)), may all be mounted to the display cover to form a display assembly that is structurally rigid. In order to customize such a display cover, there are a number of undesirable options. For example, the display cover may be personalized before the manufacture of the display assembly. However, this solution does not provide flexibility for the user who purchases their IHS and then decides that they wish to personalize it later, or to a user who decides they would like to change how their IHS is personalized. In another example, the display assembly may be disassembled and the display cover replaced. However, this solution is costly in time and/or money as the display assembly will typically have to be disassembled by a professional, and such disassembly risks damaging the display assembly components. In yet another example, a personalized changeable cover may be coupled to the display assembly on top of the display cover. However, this solution increases overall cost and thickness of the IHS.

Accordingly, it would be desirable to provide a removable display cover.

SUMMARY

According to one embodiment, a display assembly includes a display bezel, a display mounted to the display bezel, a display cable coupled to the display, and a display cover coupled to the display bezel such that the display cover is operable to be decoupled from the display bezel while the display remains mounted to the display bezel and the display cable remains coupled to the display.

BRIEF DESCRIPTION OF THE DRAWINGS

FIG. 2b is a side view illustrating an embodiment of a display cover coupling member located on the display bezel of FIG. 2a.

FIG. 3b is a bottom perspective view illustrating an embodiment of the carrier sheet of FIG. 3a.

FIG. 4b is a partial cross-sectional view illustrating an embodiment of a display bezel coupling member located on the display cover of FIG. 4a.

FIG. 6h is a partial cross-sectional view illustrating an embodiment of the display bezel coupling member of FIG. 4b engaging the display cover coupling member of FIG. 2b during the coupling of the display cover of FIG. 4a to the display bezel of FIG. 2a.

FIG. 6j is a partial cross-sectional view illustrating an embodiment of the display bezel coupling member of FIG. 4b secured in the display cover coupling member of FIG. 2b upon the coupling of the display cover of FIG. 4a to the display bezel of FIG. 2a.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
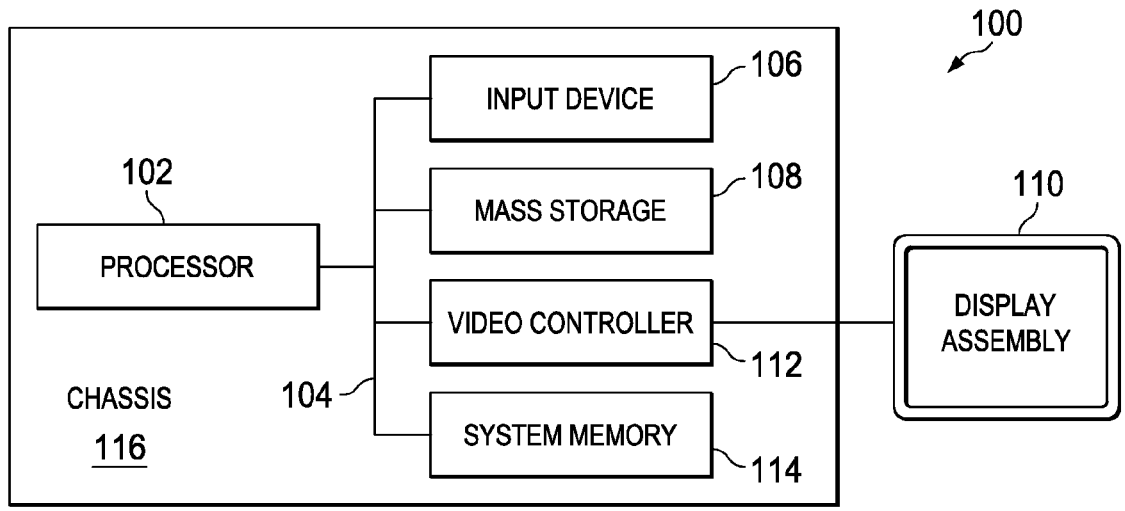
FIG. 1 is a schematic view illustrating an embodiment of an IHS.

In one embodiment, IHS 100, FIG. 1, includes a processor 102, which is connected to a bus 104. Bus 104 serves as a connection between processor 102 and other components of computer system 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display assembly 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. In an embodiment, the display assembly 110 is part of the chassis 116. In an embodiment, the display assembly 110 is moveably coupled to the chassis 116. It should be understood that other buses and intermediate circuits can be deployed between the components described above and processor 102 to facilitate interconnection between the components and the processor 102.

Figure 2B:
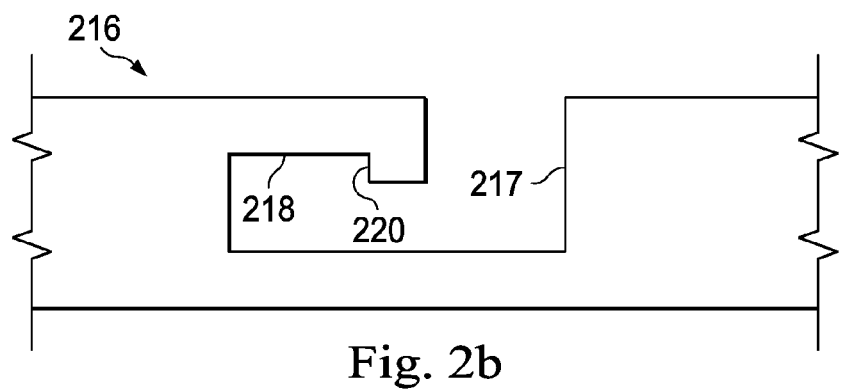
Figure 2A:
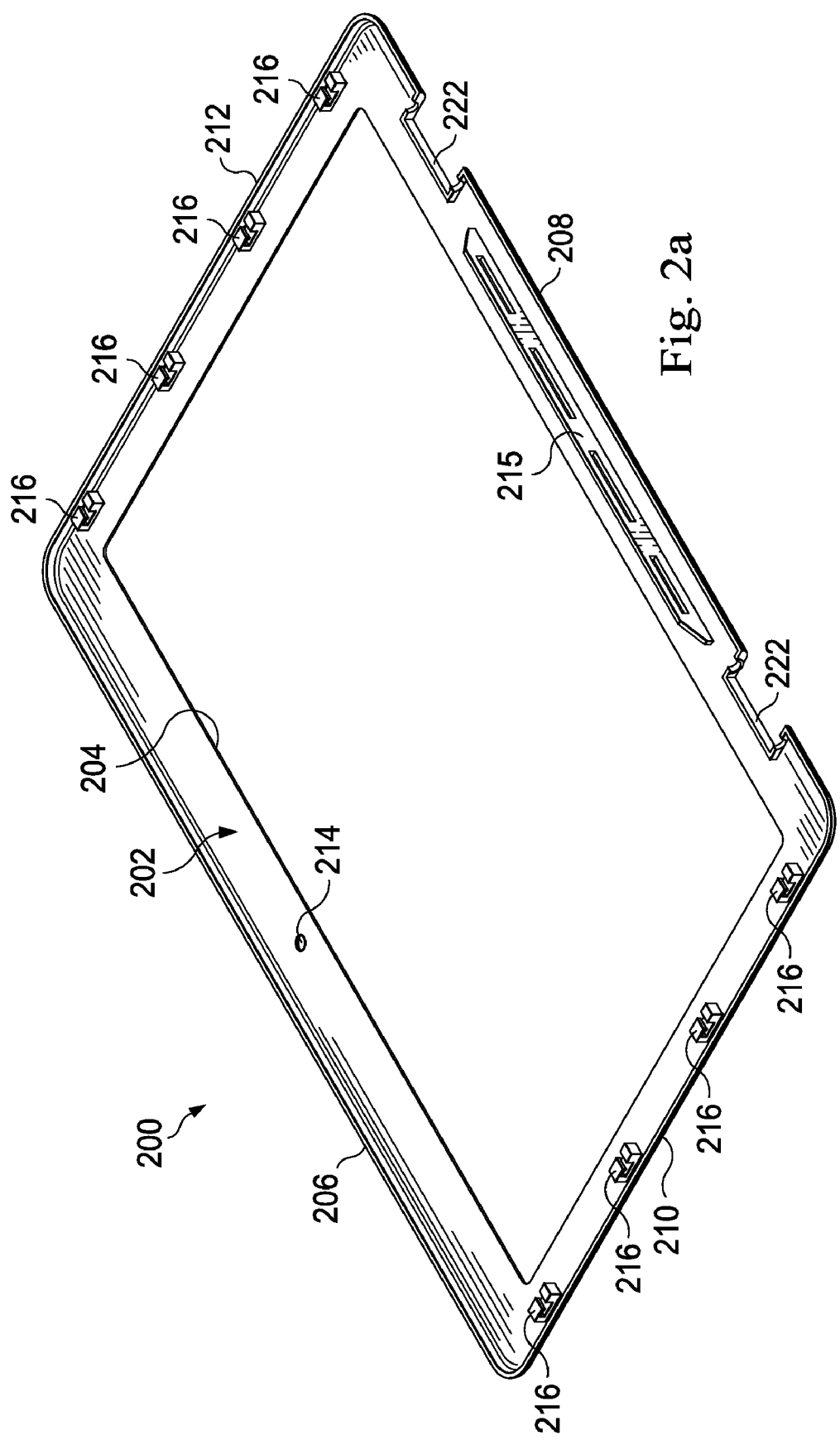
FIG. 2a is a perspective view illustrating an embodiment of a display bezel.

Referring now to FIGS. 2a and 2b, a display bezel 200 is illustrated. The display bezel 200 includes a base 202 that defines a display window 204 that is centrally located on the base 202. A top wall 206 extends from an edge of the base 202. A bottom wall 208 extends from an edge of the base 202 that is opposite the top wall 206. A pair of side walls 210 and 212 extend from opposite edges of the base 202 and between the ends of the top wall 206 and the bottom wall 208. A camera lens 214 is centrally located on the base 202 between the top wall 206 and the display window 204. A display support bracket 215 is centrally located on the base 202 between the bottom wall 208 and the display window 204. Each of the side walls 210 and 212 includes a display cover coupling member 216. For example, the side wall 210 includes a display cover coupling member 216, illustrated in FIG. 2b, having an L-shaped entrance channel 217, a securing channel 218 located adjacent the L-shaped entrance channel 217, and a securing surface 220 located immediately adjacent the securing channel 218. A pair of hinge channels 222 are defined by the base 202 and the bottom wall 208 and located adjacent the side edges 210 and 212, respectively. In an embodiment, the display bezel 200 including the base 202, top wall 206, bottom wall 208, and side walls 210 and 212, may be fabricated from a plastic material to provide better antenna signal performance, a magnesium material to provide increased strength without sink mark issues, and/or a variety of other materials known in the art.

Figure 3A:
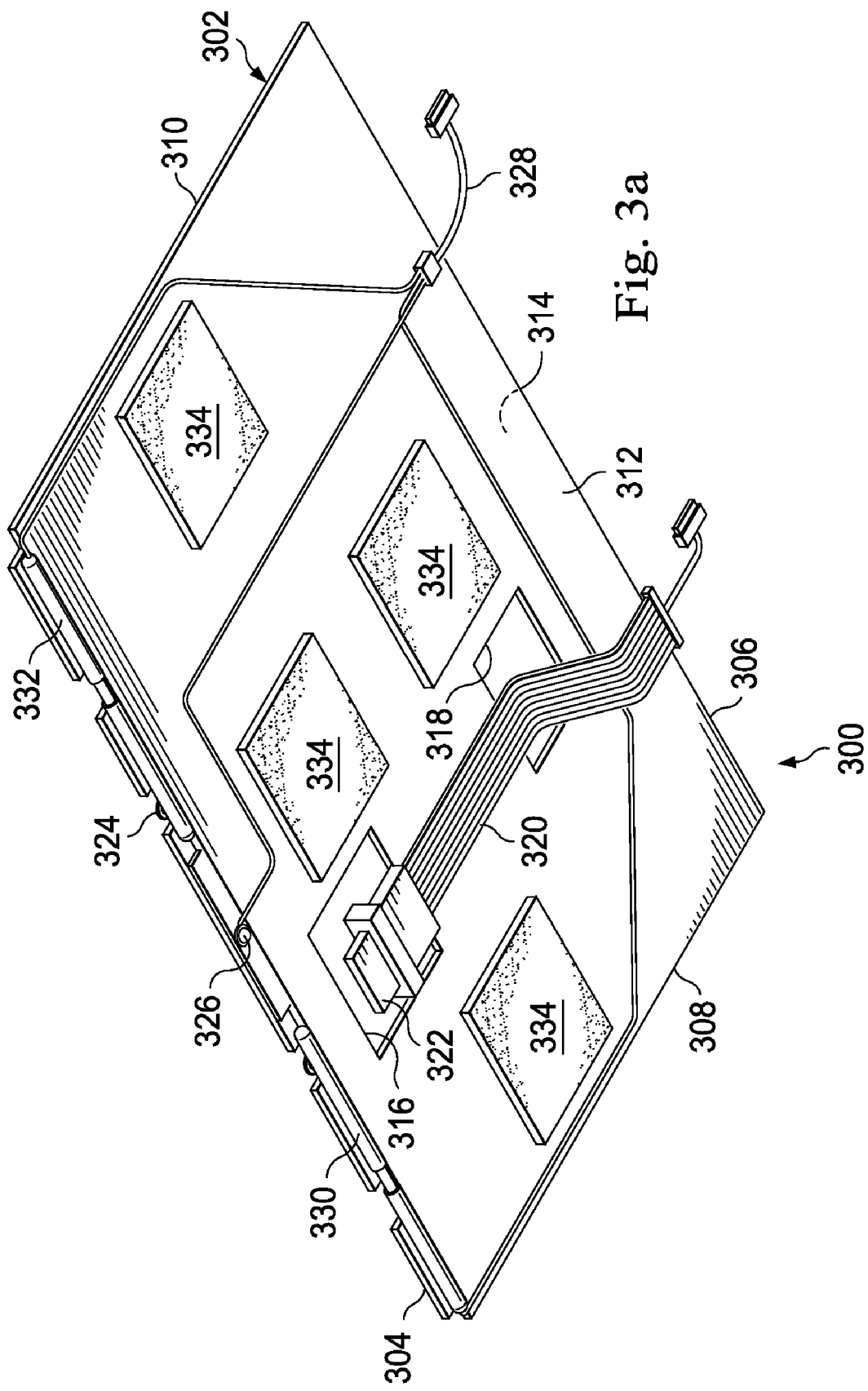
FIG. 3a is a top perspective view illustrating an embodiment of a carrier sheet.
Figure 3B:
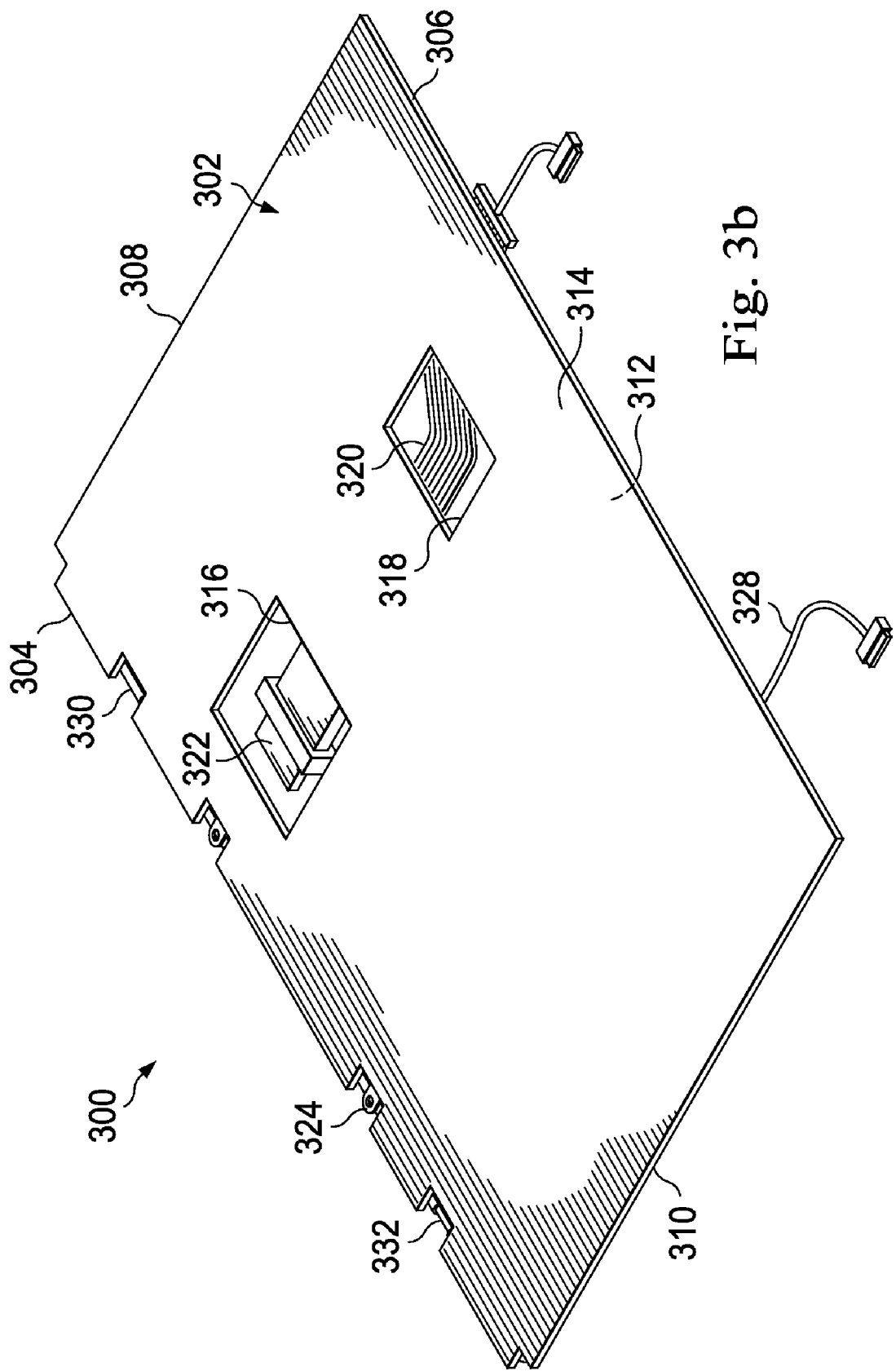

Referring now to FIGS. 3a and 3b, a carrier sheet 300 is illustrated. The carrier sheet 300 includes a carrier base 302 having a top edge 304, a bottom edge 306 located opposite the top edge 304, a pair of opposing side edges 308 and 310 extending between the top edge 304 and the bottom edge 306, a top surface 312 extending between the top edge 304, the bottom edge 306, and the side edges 308 and 310, and a bottom surface 314 located opposite the top surface 312 and extending between the top edge 304, the bottom edge 306, and the side edges 308 and 310. In an embodiment, the carrier base 302 is fabricated from a 0.4 mm thick MYLAR material. A cabling aperture 316 is defined by the carrier base 302, extends through the carrier base 302 from the top surface 312 to the bottom surface 314, and is located adjacent the top edge 304 of the carrier base 302. A cabling aperture 318 is defined by the carrier base 302, extends through the carrier base 302 from the top surface 312 to the bottom surface 314, and is located between the cabling aperture 316 and the bottom edge 306 of the carrier base 302. A display cable 320 is located on the top surface 312 of the carrier base 302 and extends across the bottom edge 306 of the carrier base 302, over the cabling aperture 318, and over the cabling aperture 316. The display cable 320 includes a connector 322 that is located immediately adjacent the cabling aperture 316. A carrier sheet support bracket 324 is located along the top edge 304 of the carrier base 302 and extends between the side edges 308 and 310. A camera 326 is located adjacent the carrier sheet support bracket 324 and the top edge 304 of the carrier base 302, and a camera cable 328 extends from the camera 326, along the top surface 312 of the carrier base 302, and across the bottom edge 306 of the carrier base 302. A pair of antennas 330 and 332 are located adjacent the carrier sheet support bracket 324 and the top edge 304 of the carrier base 302 on opposite sides of the camera 326. A plurality of display engagement members 334 are located on the top surface 312 of the carrier base 302. In an embodiment, the display engagement members 334 are fabricated from a relatively soft material such as, for example, a sponge material, in order to provide, for example, shock isolation and protection for a display. In an embodiment, components like the antennas 330 and 332, wire routing (e.g., the display cable 320 and the camera cable 328), the camera 326, and/or a variety of other components known in the art may be coupled to the carrier sheet 300 using, for example, double sided tape, adhesives, and/or a variety of other methods known in the art.

Figure 4B:
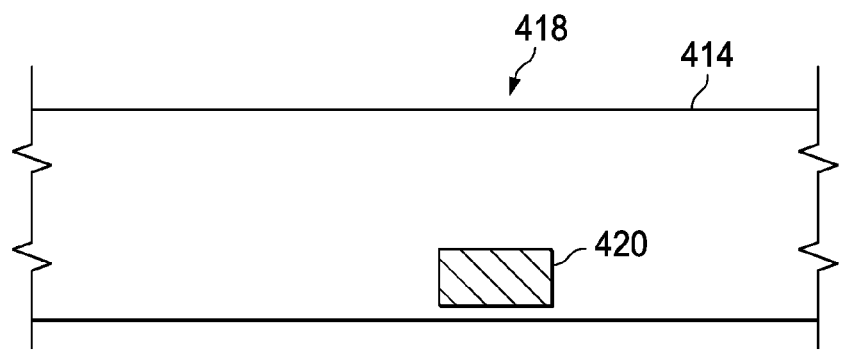
Figure 4A:
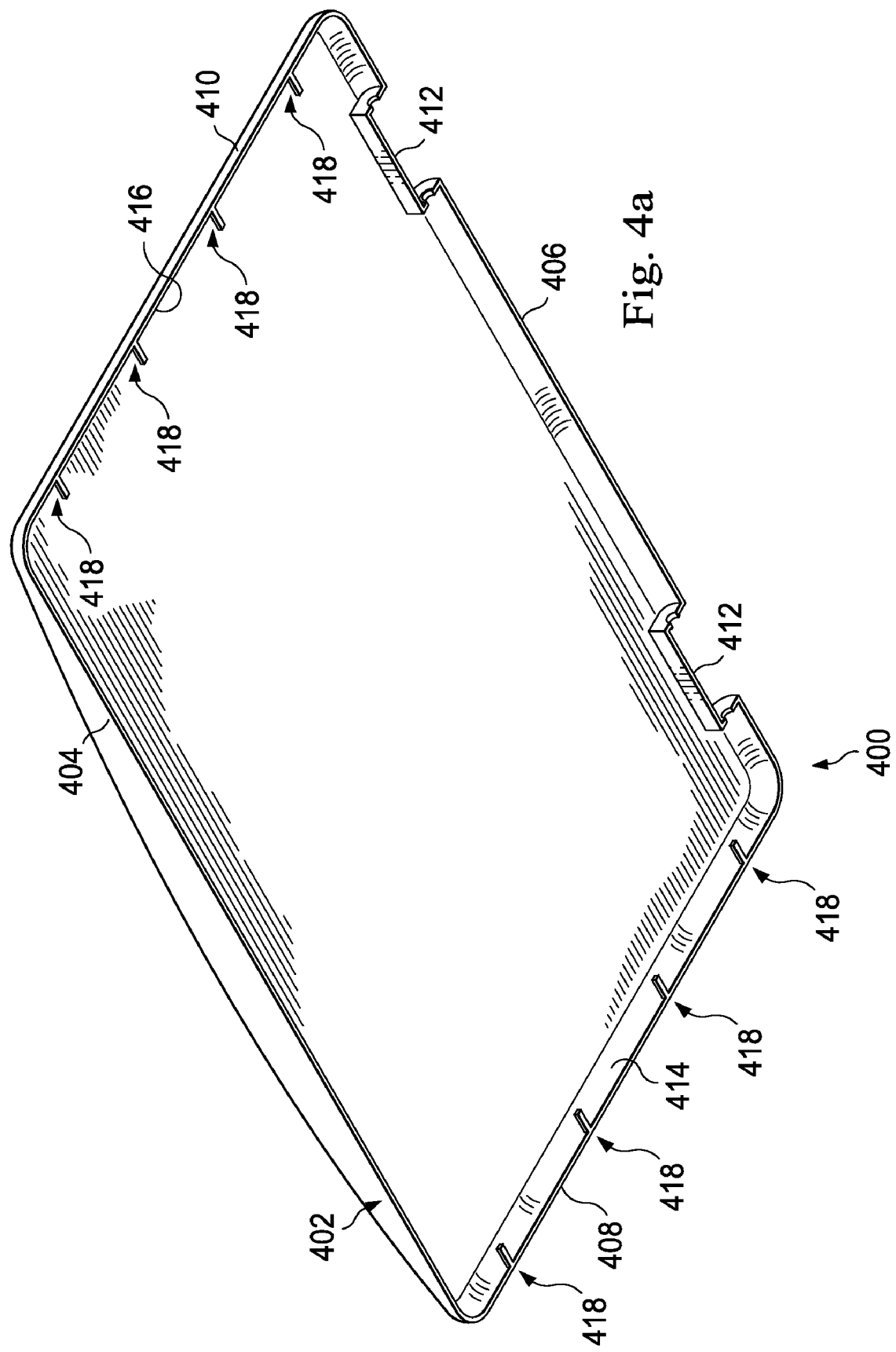
FIG. 4a is a perspective view illustrating an embodiment of a display cover.

Referring now to FIGS. 4a and 4b, a display cover 400 is illustrated. The display cover 400 includes a base 402 having a top edge 404, a bottom edge 406 located opposite the top edge 404, and a pair of opposing side edge 408 and 410 extending between the top edge 404 and the bottom edge 406. A pair of hinge channels 412 are defined by the base 402 and located adjacent the bottom edge 406 and the side edges 408 and 410, respectively. A wall 414 extends from the side edge 408 of the base 402 and a wall 416 extends from the side edge 410 of the base 402. Each of the walls 414 and 416 includes a display bezel coupling member 418. For example, the wall 414 may include a display bezel coupling member 418 having a coupling beam 420 that extends from the wall 414 in the same direction as the base 402 extends from the wall 414.

Figure 5:
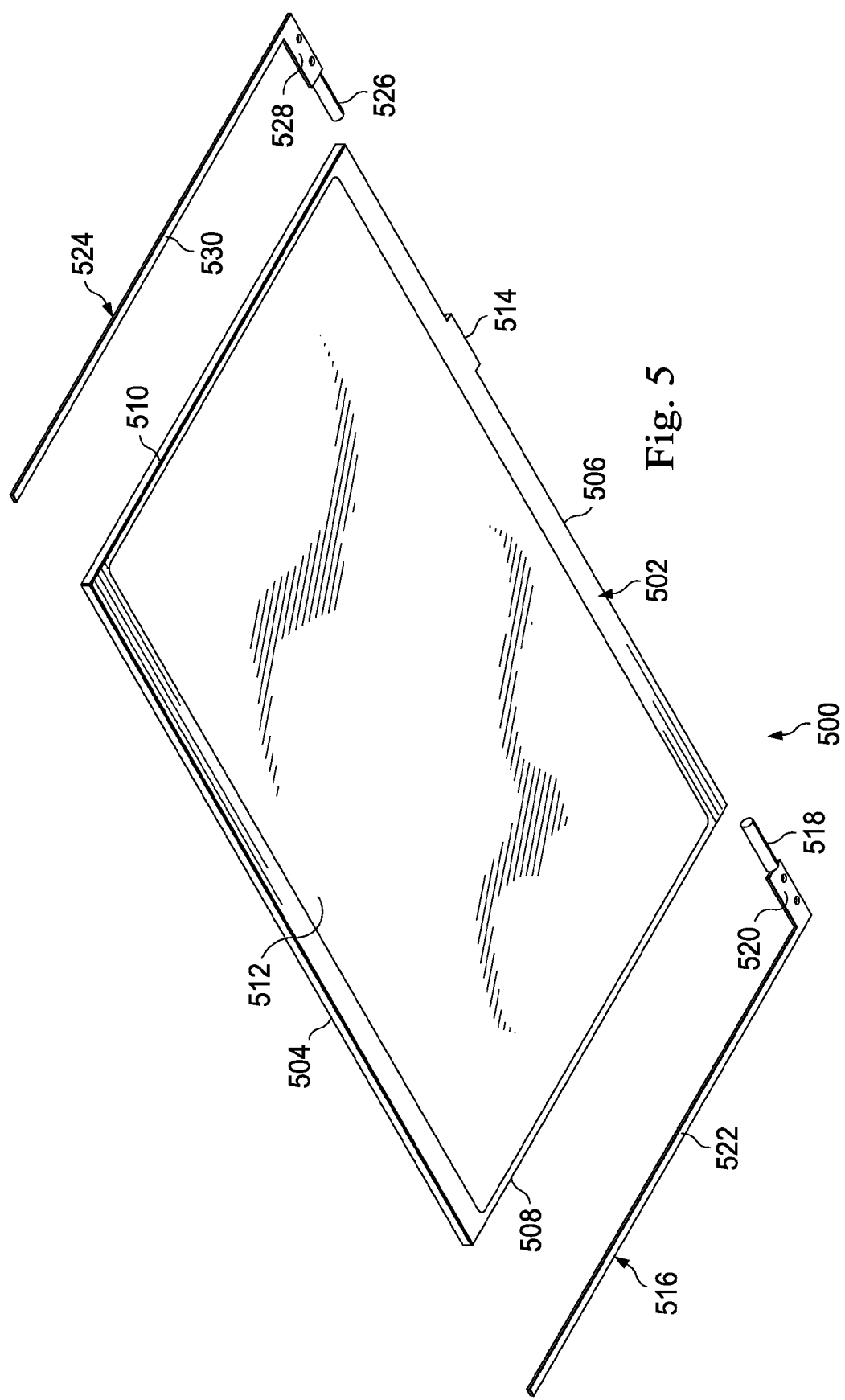
FIG. 5 is a perspective view illustrating an embodiment of a display.

Referring now to FIG. 5, a display 500 is illustrated. The display 500 includes a base 502 having a top edge 504, a bottom edge 506 located opposite the top edge 504, and a plurality of side edges 508 and 510 extending between the top edge 504 and the bottom edge 506. A screen 512 is framed by the base 502 between the top edge 504, the bottom edge 506, and the side edges 508 and 510. A connector 514 extends from the bottom edge 506 of the base 502. In an embodiment, the display 500 may be a liquid crystal display (LCD) or a variety of other display types known in the art. A hinge bracket 516 that includes a hinge 518, a bezel mounting member 520, and a chassis mounting member 522, may be mounted to the side edge 508 of the base 502 using fasteners or other methods known in the art. A hinge bracket 524 that includes a hinge 526, a bezel mounting member 528, and a chassis mounting member 530, may be mounted to the side edge 510 of the base 502 using fasteners or other methods known in the art.

Figure 6A:
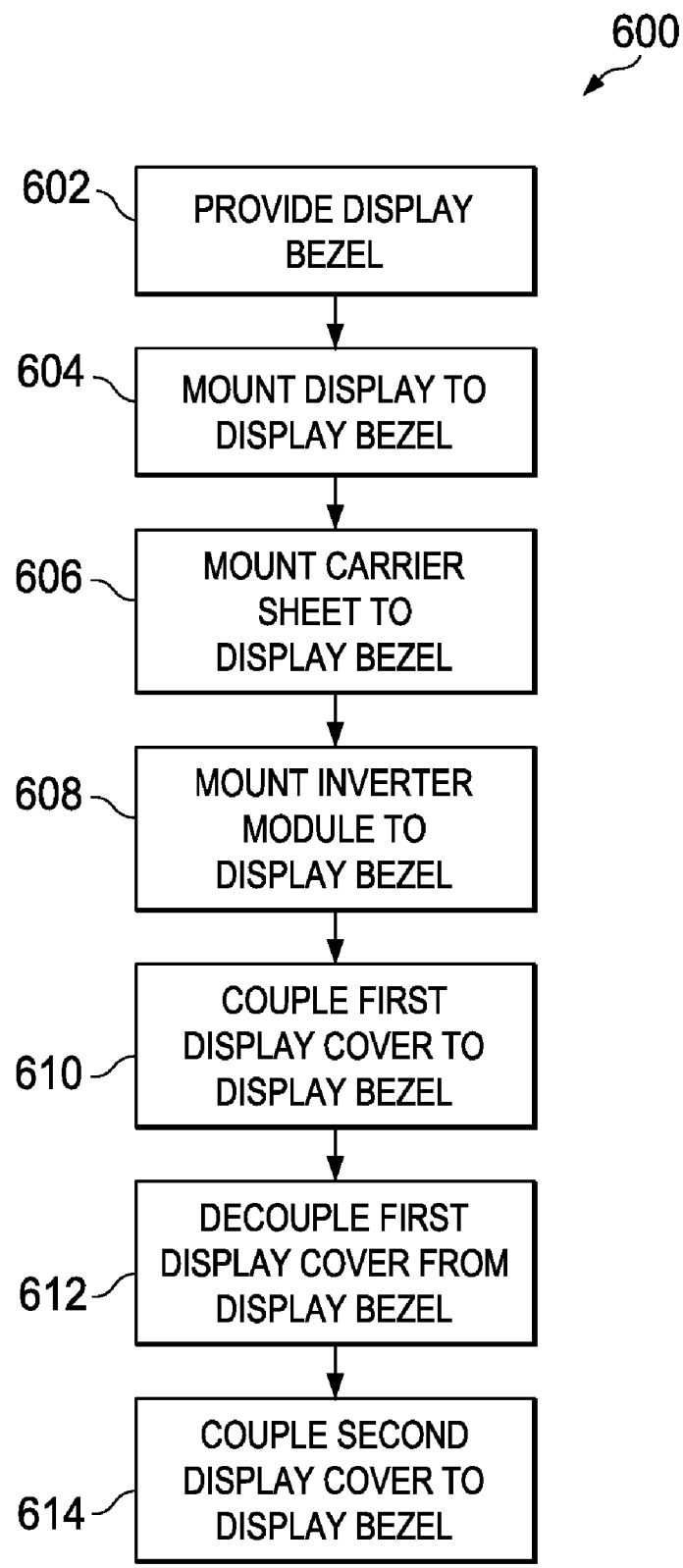
FIG. 6a is a flow chart illustrating an embodiment of a method for providing a removable display cover.
Figure 6B:
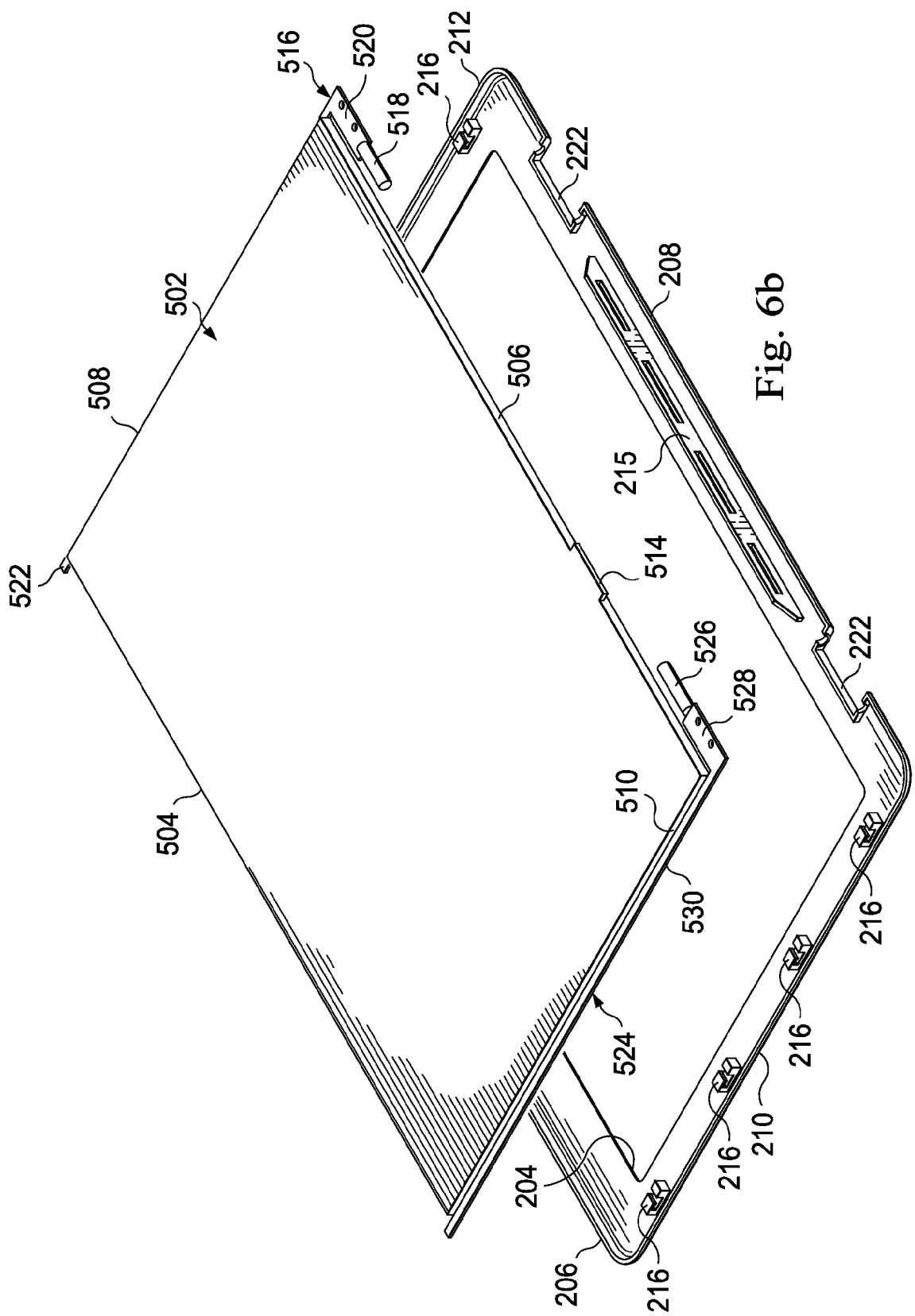
FIG. 6b is a perspective view illustrating an embodiment of the display of FIG. 5 being mounted to the display bezel of FIGS. 2a and 2b.
Figure 6C:
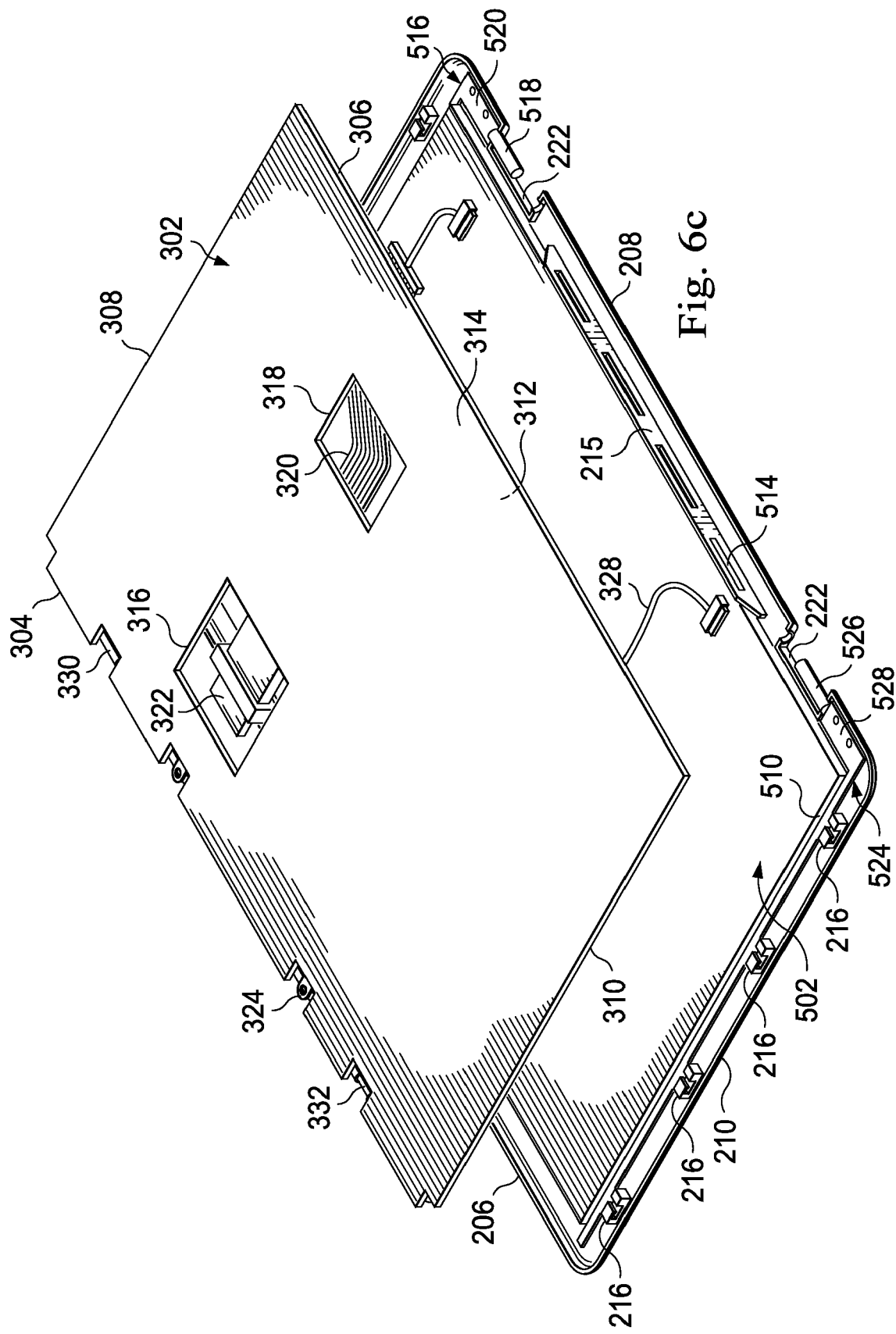
FIG. 6c is a perspective view illustrating an embodiment of the carrier sheet of FIGS. 3a and 3b being mounted to the display bezel of FIGS. 2a and 2b.

Referring now to FIGS. 6a, 6b and 6c, a method 600 for providing a display assembly with enhanced personalization is illustrated. The method 600 begins at block 602 where the display bezel 200, illustrated in FIGS. 2a and 2b, is provided. The method 600 then proceeds to block 604 where the display 500, illustrated in FIG. 5, is mounted to the display bezel 200. The display 500 is positioned adjacent the display bezel 200 such that the screen 512 of the display 500 is aligned with the display window 204 and the bottom edge 506 of the display 500 is located adjacent the bottom wall 208 of the display bezel 200, as illustrated in FIG. 6b. The display 500 may then be engaged with the display bezel 200 such that it is located between the top wall 206, the bottom wall 208, and the pair of side walls 210 and 212, as illustrated in FIG. 6c. With the display 500 engaging the display bezel 200, the display 500 engages the display support bracket 215 and the bezel mounting members 520 and 528 may be mounted to the display bezel 200, using fasteners and/or other methods known in the art, in order to mount the display 500 to the display bezel 200.

Figure 6D:
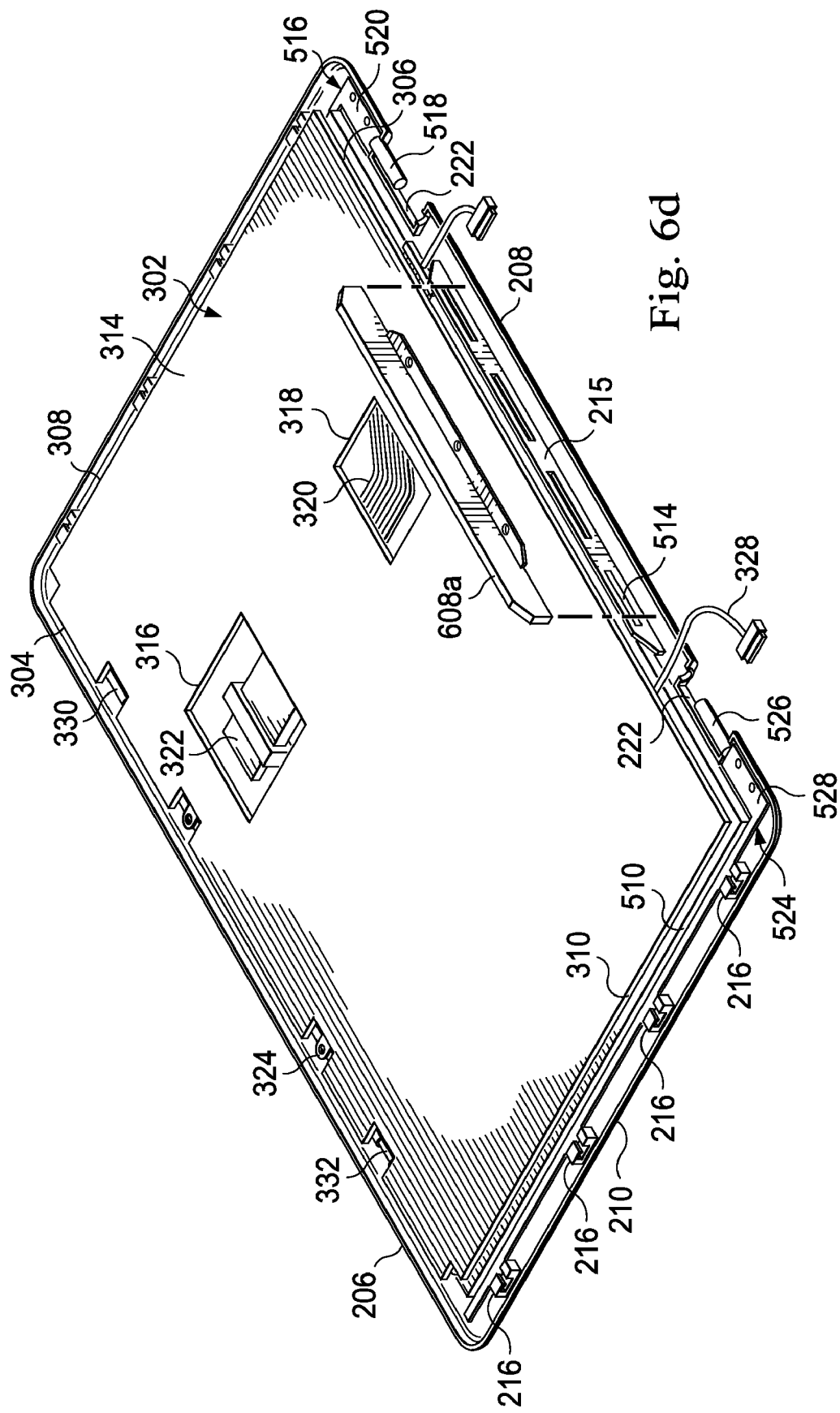
FIG. 6d is a perspective view illustrating an embodiment of an inverter module being mounted to the display bezel of FIGS. 2a and 2b.

Referring now to FIGS. 6a, 6c and 6d, the method 600 proceeds to block 606 where the carrier sheet 300, illustrated in FIGS. 3a and 3b, is mounted to the display bezel 200. The carrier sheet 300 is positioned adjacent the display bezel 200 and display 500 such that the top surface 312 of the carrier sheet 300 is immediately adjacent the display 500 and the carrier sheet support bracket 324 is adjacent the top wall 206 of the display bezel 200, as illustrated in FIG. 6c. The carrier sheet 300 may then be brought into engagement with the display 500, the connector 322 on the display cable 320 may be mated with a connector (not shown) on the display 500, and the carrier sheet support bracket 324 may be mounted to the display bezel 200, using fasteners or other methods known in the art, in order to mount the carrier sheet 300 to the display bezel 200, as illustrated in FIG. 6d. In an embodiment, including the components of the carrier sheet 300 on the carrier sheet 300 may, for example, contribute to assembly efficiencies while protecting the components of the carrier sheet 300. However, one of skill the art will recognize that the components of the carrier sheet 300 may be coupled to the display 500 and the display bezel 200 without the need for the carrier sheet 300 while still falling within the scope of the present disclosure.

Figure 6E:
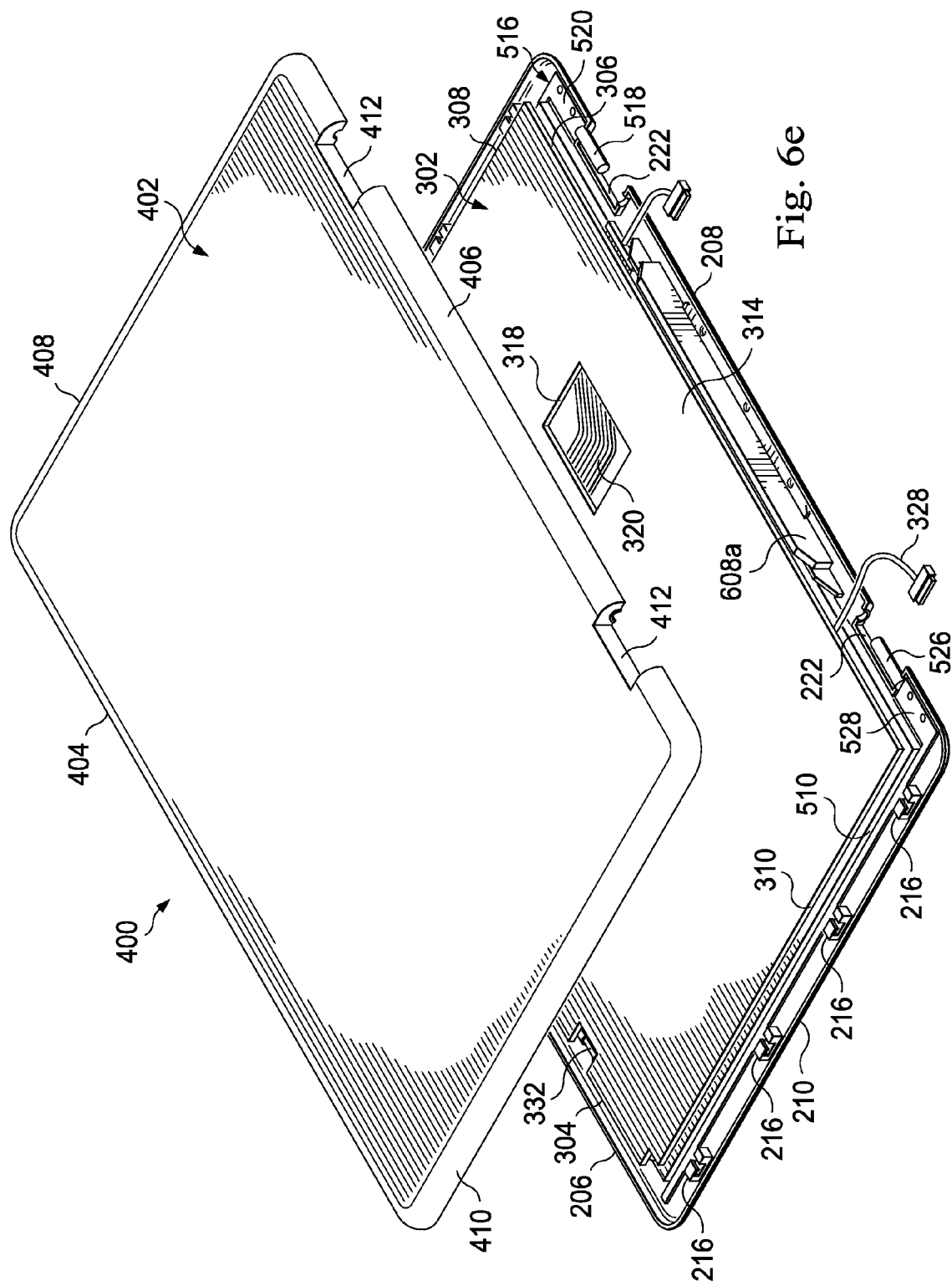
FIG. 6e is a perspective view illustrating an embodiment of the display cover of FIGS. 4a and 4b being coupled to the display bezel of FIGS. 2a and 2b.
Figure 6F:
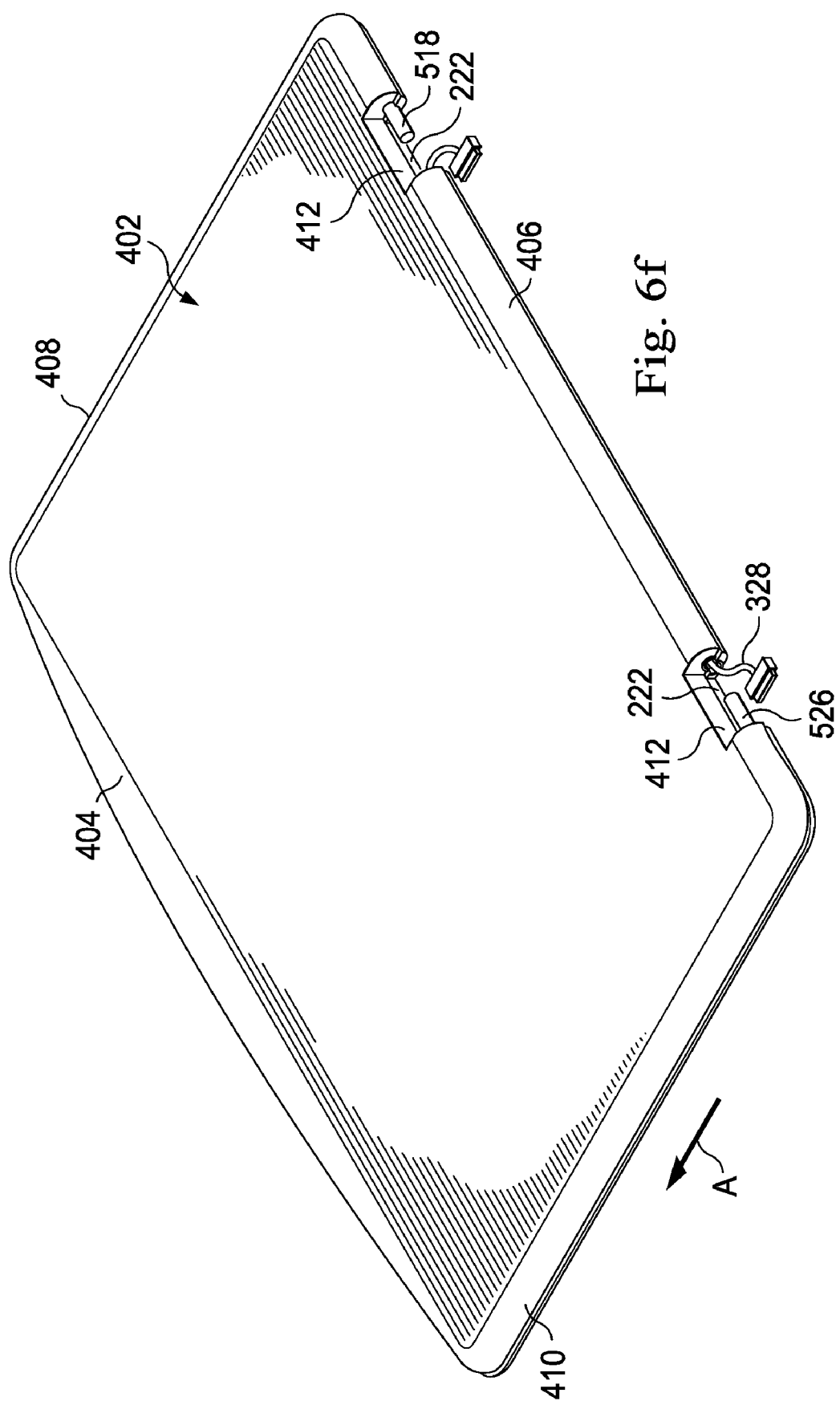
FIG. 6f is a perspective view illustrating an embodiment of the display cover of FIGS. 4a and 4b engaging the display bezel of FIGS. 2a and 2b during coupling.

Referring now to FIGS. 6a, 6d and 6e, the method 600 proceeds to block 608 where an inverter module 608a is mounted to the display bezel 200. The inverter module 608a is positioned adjacent the display support bracket 215 on the display bezel 200, illustrated in FIG. 6d, and then brought into engagement with the display bezel 200 such that the inverter module 608a is located between the display support bracket 215 and the bottom wall 208 of the display bezel. The connector 514 that extends from the bottom edge 506 of the display 500 is coupled to the inverter module 608a, and the inverter module 608a may be mounted to the display bezel 200 using fasteners or other methods known in the art, as illustrated in FIG. 6e. In an embodiment, the inverter module 608a may be included on the carrier sheet 300.

Figure 6G:
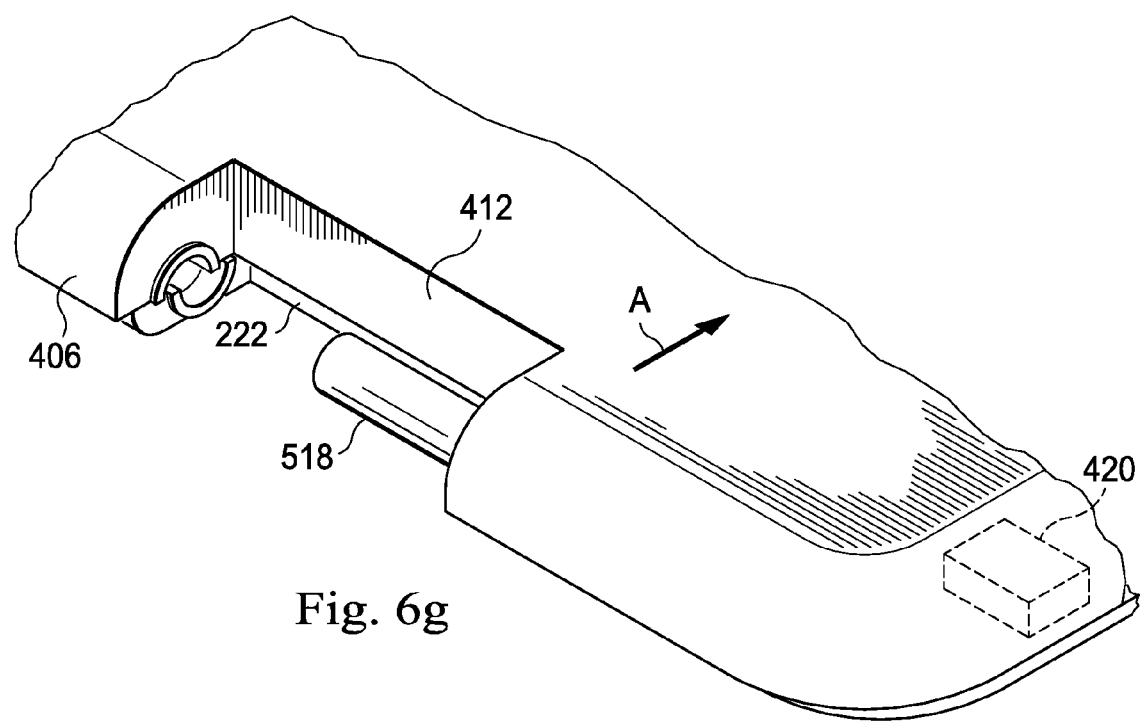
FIG. 6g is a perspective view illustrating an embodiment of the display cover of FIGS. 4a and 4b being offset from the display bezel of FIGS. 2a and 2b during coupling.
Figure 6H:
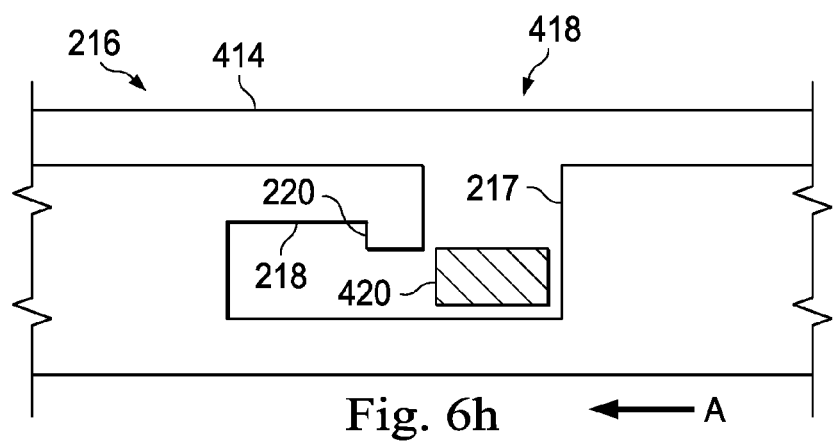
Figure 6I:
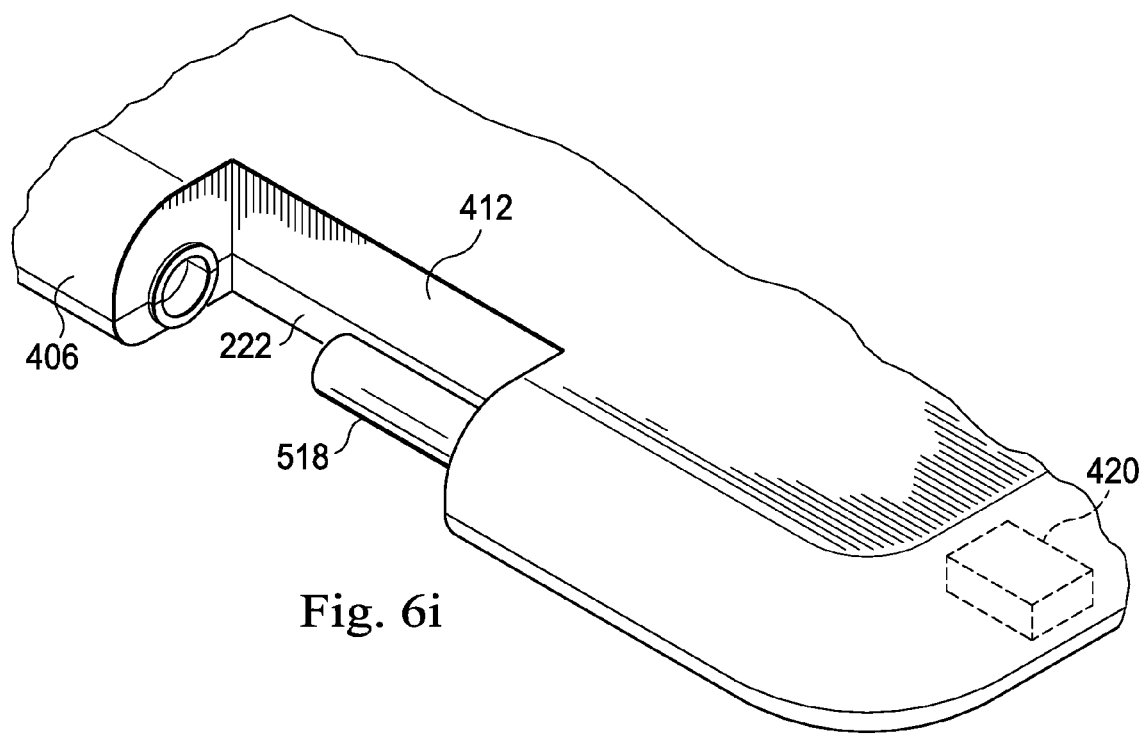
FIG. 6i is a perspective view illustrating an embodiment of the display cover of FIGS. 4a and 4b aligned with the display bezel of FIGS. 2a and 2b during coupling.
Figure 6J:
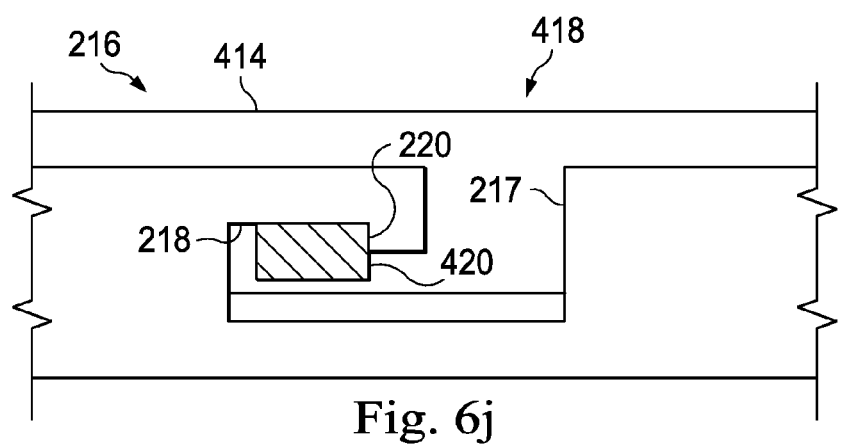
Figure 6K:
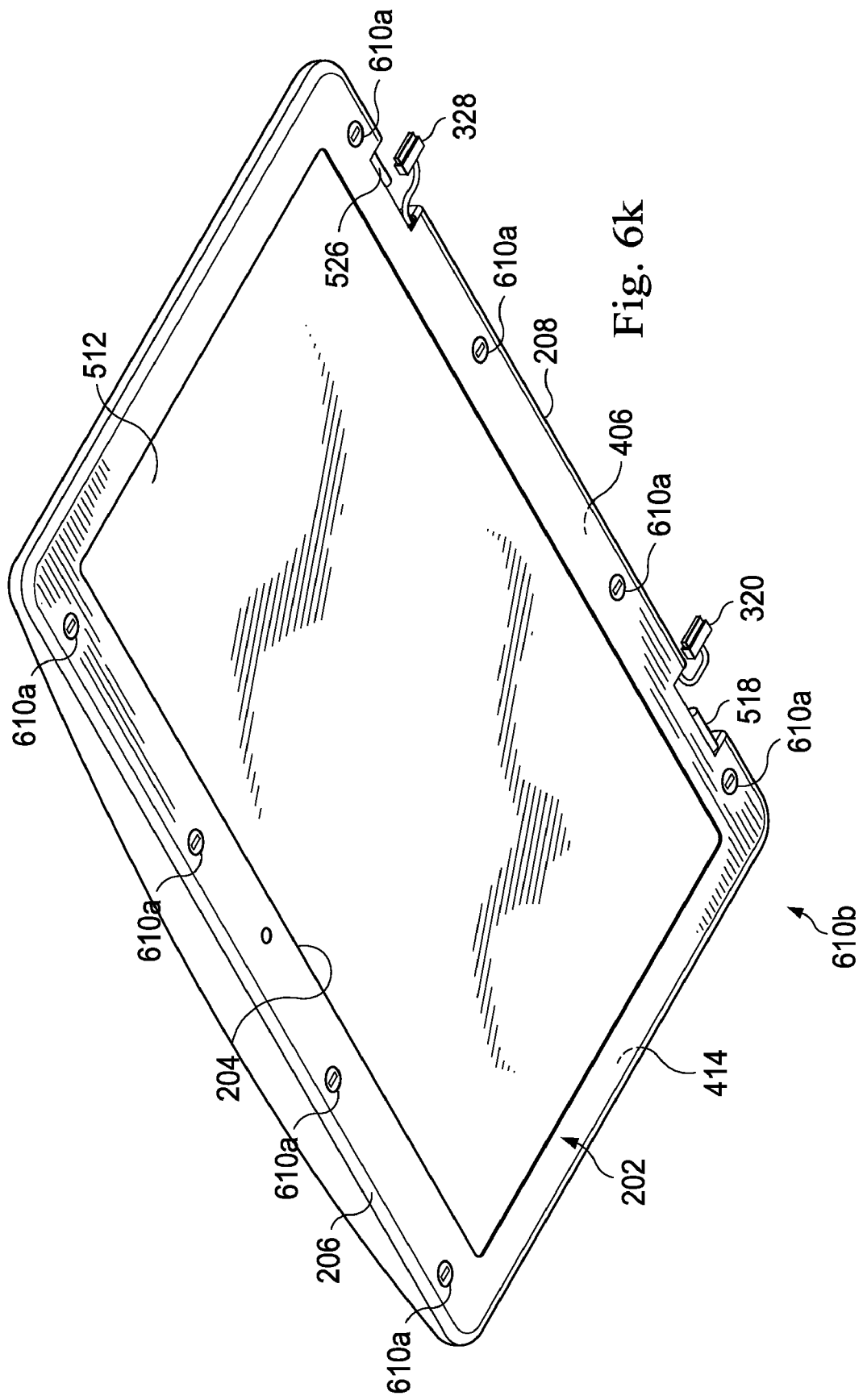
FIG. 6k is a perspective view illustrating an embodiment of a display assembly including the display bezel of FIGS. 2a and 2b, the carrier sheet of FIGS. 3a and 3b, the display cover of FIGS. 4a and 4b, and the display of FIG. 5.

Referring now to FIGS. 6a, 6e, 6f, 6g, 6h, 6i, 6j and 6k, the method 600 proceeds to block 610 where the display cover 400, illustrated in FIGS. 4a and 4b, is coupled to the display bezel 200 to provide a display assembly 610b. The display cover 400 is positioned adjacent the display bezel 200 such that the walls 414 and 416 on the display cover 400 are located adjacent the side walls 212 and 210, respectively, on the display bezel 200, and each of the display bezel coupling members 418 on the walls 414 and 416 are aligned with respective display cover coupling member 216 on the side walls 212 and 210, respectively, as illustrated in FIG. 6e. The display cover 400 is then brought into engagement with the display bezel 200 such that the coupling beams 420 on the display bezel coupling members 418 enter the L-shaped entrance channels 217 on the display cover coupling members 216, as illustrated in FIG. 6h. With the coupling beams 420 in the L-shaped entrance channels 217, the display cover 400 is offset from the display bezel 200, as illustrated in FIG. 6g. The display cover 400 may then be moved in a direction A, illustrated in FIGS. 6f, 6g and 6h, such that the coupling beams 420 on the display bezel coupling members 418 enter the securing channel 218 and engage the securing surface 220 on the display cover coupling members 216, as illustrated in FIG. 6j. In an embodiment, a resilient force may be provided to urge the display bezel coupling members 418 into the securing channel 218 by, for example, resiliency in the display cover 400 and/or the display bezel 200, a resilient member in the assembly that engages the display cover 400 and/or display bezel 200, and/or a variety of other methods known in the art. With the coupling beams 420 in the securing channels 218 and engaging the securing surfaces 220, the display cover 400 is aligned with the display bezel 200, as illustrated in FIG. 6i. In an embodiment, the toolless coupling of the display cover 400 to the display bezel 200 is sufficient to keep the display cover 400 coupled to the display bezel 200 without the need of fasteners, and one of skill in the art will recognize that modifications to the structure of the display cover coupling members 216 and display bezel coupling members 418 may enhance such coupling. In an embodiment, a plurality of fasteners 610a may be used between the display bezel 200 and the display cover 400 in order to further secure the display cover 400 to the display bezel 200, as illustrated in FIG. 6k. In an embodiment, the display assembly 610b may be, for example, the display assembly 110, described above with reference to FIG. 1. In an embodiment, the coupling of the display cover 400 and the display bezel 200 to provide the display assembly 610b sandwiches the brackets housed in the display assembly 610b to provide increased rigidity for the display assembly 610b. In an embodiment, the plurality of fasteners 610a may be used to further increase the rigidity of the display assembly 610b by, for example, using the fasteners 610a at the corners of the display assembly 610b to engage the display cover 400, the bracket 324, the brackets 516 and/or 524, and the display bezel 200, and the remaining plurality of fasteners 610a engaging the display cover 400, the bracket 324, and the display bezel 200. The display assembly 610b may then be coupled to an IHS chassis such as, for example, the IHS chassis 116 described above with reference to FIG. 1, by mounting the chassis mounting members 522 and 530 to the IHS chassis and coupling the display cable 320 and the camera cable 328 to the appropriate connections in the IHS chassis. In an embodiment, the display assembly 610b may be coupled to a portable IHS chassis.

Referring now to FIGS. 6a, 6e, 6f, 6g, 6h, 6i, 6j and 6k, the method 600 proceeds to block 612 where the display cover 400, illustrated in FIGS. 4a and 4b, is decoupled to the display bezel 200. Block 610 of the method 600 may be applied in reverse such that, for example, fasteners 610a are removed from the display bezel 200 and the display cover 400, if necessary, the coupling beams 420 are removed from the securing channels 218 and the L-shaped entrance channels 217, and the display cover 400 is removed from the display bezel 200. The method 600 then proceeds to block 614 where a second display cover is coupled to the display bezel 200. In an embodiment, the second display cover is substantially similar in structure and operation to the display cover 400, described above with reference to FIGS. 4a and 4b, with the provision that the second display cover has been personalized. In an embodiment, the second display cover may include a new display cover selected by the user of the IHS to replace the display cover 400. In an embodiment, the second display cover may include the first display cover 400 after is has been removed from the display bezel 200 and been personalized. In an embodiment, the second display cover may include a variety of other second display covers known in the art. Personalization of a display cover may include etching the display cover, printing to the display cover by, for example, using 3D inkjet imaging technology such as Pictaflex, providing a user with multiple display covers each having a different color, and/or a variety of other personalization features known in the art. The second display cover may be coupled to the display bezel 200 as described above with reference to block 610 of the method 600. Thus, a display assembly is provided that allows the display cover to be quickly and easily removed and replaced in order to enable enhanced and efficient personalization of the display assembly.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A display assembly, comprising
a display bezel defining a display window;
a display mounted to the display bezel such that a display screen on the display is located immediately adjacent the display window;
a carrier sheet that comprises a display cable and that is mounted to the display bezel, wherein the display cable is coupled to and extends from the display; and
a display cover coupled to the display bezel such that the display cover is operable to be decoupled from the display bezel while the display and the carrier sheet remain mounted to the display bezel and the display cable remains coupled to and extending from the display.

2. The display assembly of claim 1, wherein the display comprises a plurality of hinge brackets that are mounted to the display bezel such that the display is mounted to the display bezel.

3. The display assembly of claim 1, further comprising:
an inverter module mounted to the display bezel, wherein the display cover is coupled to the display bezel such that the display cover is operable to be decoupled from the display bezel while the inverter module remains mounted to the display bezel.

4. The display assembly of claim 1, wherein the display cover is toollessly coupled to the display bezel.

5. The display assembly of claim 1, wherein the carrier sheet comprises an antenna.

6. The display assembly of claim 1, wherein the carrier sheet comprises a camera and a camera cable.

7. The display assembly of claim 1, wherein the carrier sheet comprises a carrier sheet support bracket that is mounted to the display bezel such that the carrier sheet is mounted to the display bezel.

8. An information handling system, comprising:
a chassis housing a processor and a storage that is coupled to the processor; and
a display assembly coupled to the chassis, the display assembly comprising:
a display bezel defining a display window;
a display mounted to the display bezel such that a display screen on the display is located immediately adjacent the display window;
a carrier sheet that comprises a display cable and that is mounted to the display bezel, wherein the display cable is coupled to and extends from the display, wherein the display cable couples the display to the processor; and
a display cover coupled to the display bezel such that the display cover is operable to be decoupled from the display bezel while the display and the carrier sheet remains mounted to the display bezel and the display cable remains coupled to and extending from the display and continues to couple the display to the processor.

9. The system of claim 8, wherein the display comprises a plurality of hinge brackets that are mounted to the display bezel such that the display is mounted to the display bezel.

10. The system of claim 8, further comprising:
an inverter module mounted to the display bezel, wherein the display cover is coupled to the display bezel such that the display cover is operable to be decoupled from the display bezel while the inverter module remains mounted to the display bezel.

11. The system of claim 8, wherein the display cover is toollessly coupled to the display bezel.

12. The system of claim 8, wherein the carrier sheet comprises an antenna.

13. The system of claim 8, wherein the carrier sheet comprises a camera and a camera cable that couples the camera to the processor.

14. The system of claim 8, wherein the carrier sheet comprises a carrier sheet support bracket that is mounted to the display bezel such that the carrier sheet is mounted to the display bezel.

15. A method for providing a removable display cover, comprising:
providing a display bezel defining a display window;
mounting a display to the display bezel such that a display screen on the display is located immediately adjacent the display window;
mounting a carrier sheet that comprises a display cable to the display bezel, wherein the display cable is coupled to the display such that the display cable extends from the display; and
coupling a first display cover to the display bezel such that the first display cover is operable to be decoupled from the display bezel while the display and the carrier sheet remain mounted to the display bezel and the display cable remains coupled to and extending from the display.

16. The method of claim 15, further comprising:

mounting an inverter module to the display bezel, wherein the first display cover is operable to be decoupled from the display bezel while the inverter module remains mounted to the display bezel.

17. The method of claim 15, further comprising:

decoupling the first display cover from the display bezel while the display and the carrier sheet remains mounted to the display bezel and the display cable remains coupled to the display; and coupling a second display cover to the display bezel.

18. A display assembly, comprising a display bezel;

a display mounted to the display bezel, the display including a pair of hinge brackets each including a hinge;

a display cable coupled to the display;

a display cover coupled to the display bezel such that the display cover is operable to be decoupled from the display bezel while the display remains mounted to the display bezel and the display cable remains coupled to the display, the display cover including a pair of hinge channels for respectively exposing each hinge; and a carrier sheet comprising the display cable and mounted to the display bezel, wherein the display cover is coupled to the display bezel such that the display cover is operable to be decoupled from the display bezel while the carrier sheet remains mounted to the display bezel, wherein the carrier sheet comprises a carrier sheet support bracket that is mounted to the display bezel such that the carrier sheet is mounted to the display bezel.

19. An information handling system, comprising:

a chassis housing a processor and a storage that is coupled to the processor; and a display assembly coupled to the chassis, the display assembly comprising:

a display bezel;

a display mounted to the display bezel, the display including a pair of hinge brackets each including a hinge;

a display cable coupling the display to the processor;

a display cover coupled to the display bezel such that the display cover is operable to be decoupled from the display bezel while the display remains mounted to the display bezel and the display cable continues to couple the display to the processor, the display cover including a pair of hinge channels for respectively exposing each hinge; and a carrier sheet comprising the display cable and mounted to the display bezel, wherein the display cover is coupled to the display bezel such that the display cover is operable to be decoupled from the display bezel while the carrier sheet remains mounted to the display bezel, wherein the carrier sheet comprises a carrier sheet support bracket that is mounted to the display bezel such that the carrier sheet is mounted to the display bezel.

\* \* \* \* \*